Figure 1:
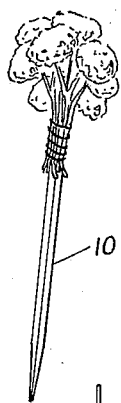

R. C. LEWIS.
FLOWER HOLDER.
APPLICATION FILED JAN. 22, 1915.

1,162,176.

Patented Nov. 30, 1915.

WITNESSES:
H. W. Meade
E. M. Culver

INVENTOR
Rollin C. Lewis
BY
A. M. Wooster
ATTORNEY

COLUMBIA PLANOGRAPH CO., WASHINGTON, D. C.

UNITED STATES PATENT OFFICE.

ROLLIN C. LEWIS, OF STAMFORD, CONNECTICUT.

FLOWER-HOLDER.

1,162,176.         Specification of Letters Patent.         Patented Nov. 30, 1915.

Application filed January 22, 1915. Serial No. 3,746.

*To all whom it may concern:*

Be it known that I, ROLLIN C. LEWIS, a citizen of the United States, residing at Stamford, county of Fairfield, State of Connecticut, have invented an Improvement in Flower-Holders, of which the following is a specification.

This invention has for its object to provide a holder for short stemmed flowers for various uses, as in making floral pieces, corsage and buttonhole bouquets, &c., which shall be adapted to be made in large quantities mechanically and at a merely nominal cost, and which will hold the flowers securely so that they will not become detached in handling.

With this object in view, I have devised the novel flower holder which I will now describe, referring to the accompanying drawing forming a part of this specification and using reference characters to indicate the several parts.

Figure 2:
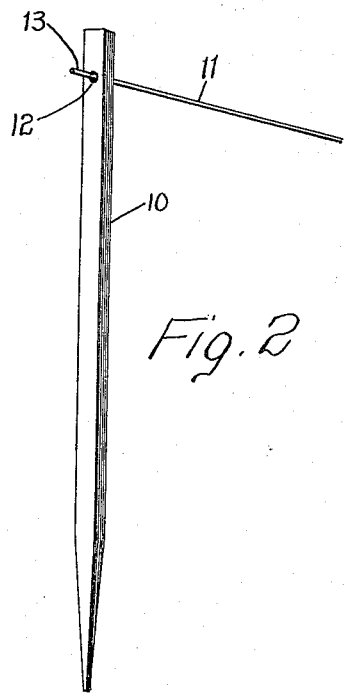
Figure 3:
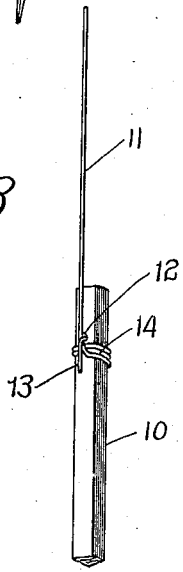
Figure 4:
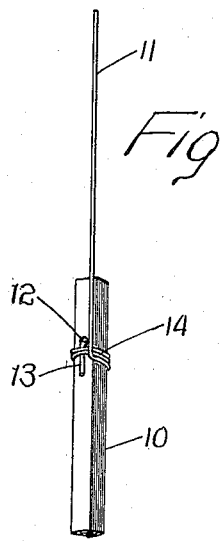

Figure 1 is a view illustrating the use of my novel flower holder, flowers being shown as attached thereto and wired in place; Fig. 2 a view on an enlarged scale illustrating steps in the operation of making my novel flower holder, and Figs. 3 and 4 are views illustrating slightly modified forms in which the wire may be manipulated to prevent detachment from the shank.

10 denotes the shank which is made of wood and is ordinarily sharpened at the lower end. In practice rectangular wooden toothpicks may be used, as they are produced by automatic machinery at a trifling cost.

The only other element of my novel holder is the wire 11 which is cut into blanks of uniform length. Each shank has a small hole 12 formed therein near one end. The wire is then passed through the hole, leaving a short end 13 projecting upon one side. The wire is then wound tightly about the shank under the short end, two or three coils 14 being amply sufficient. The wire is then bent upward, that is toward the short end of the shank, and parallel with the shank, and the short end 13 is crossed over the wire proper, as shown in Fig. 3, and bent downward parallel with the shank which securely locks the wire in place. This final locking of the wire, however, is not essential and if preferred the short end 13 may first be bent downward parallel with the shank, as in Fig. 4, the coils 14 being wound over the short end and then the wire proper bent upward, that is toward the short end of the shank, as before. The use of my novel flower holder will be readily understood from Fig. 1. The stems of the flowers are laid parallel with the upper or short end of the shank and are then secured in place by winding the wire proper about them tightly enough to hold them securely in place, as clearly shown in Fig. 1.

Having thus described my invention I claim:—

A holder for flowers used in floral decorations, comprising a rectangular wooden bar sharpened at one end and having an opening at the other end, a wire passing through the opening, having a short end thereof bent in a plane with the bar, the long end coiled several times about the bar, and terminating in a flower attaching portion.

In testimony whereof I affix my signature in presence of two witnesses.

ROLLIN C. LEWIS.

Witnesses:
W. H. BERTINE,
JAMES BROCK.

Copies of this patent may be obtained for five cents each, by addressing the "Commissioner of Patents, Washington, D. C."